(12) United States Patent
Shimizu

(10) Patent No.: US 7,871,206 B2
(45) Date of Patent: Jan. 18, 2011

(54) IMAGING APPARATUS

(75) Inventor: Naoto Shimizu, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/462,853

(22) Filed: Aug. 11, 2009

(65) Prior Publication Data

US 2010/0040362 A1 Feb. 18, 2010

(30) Foreign Application Priority Data

Aug. 15, 2008 (JP) .......................... P2008-209282

(51) Int. Cl.
*G03B 17/00* (2006.01)
(52) U.S. Cl. ...................... 396/424; 396/448
(58) Field of Classification Search .............. 396/424, 396/448, 535
See application file for complete search history.

(56) References Cited

U.S. PATENT DOCUMENTS

2007/0291166 A1* 12/2007 Misawa ....................... 348/376

FOREIGN PATENT DOCUMENTS

| JP | 57130824 A | 8/1982 |
|----|------------|--------|
| JP | U57-130824 | * 8/1982 |
| JP | 04101536 A | 4/1992 |
| JP | U04-101536 | * 9/1992 |
| JP | 09-244135 A | 9/1997 |
| JP | 10083026 A | 3/1998 |
| JP | 2006093919 A | 4/2006 |
| JP | 2007-163589 A | 6/2007 |

OTHER PUBLICATIONS

Office Action from Japanese Application No. 2008-209282, dated Apr. 6, 2010.

* cited by examiner

*Primary Examiner*—W. B. Perkey
*Assistant Examiner*—Dennis Hancock
(74) *Attorney, Agent, or Firm*—Lerner, David, Littenberg, Krumholz & Mentlik, LLP

(57) ABSTRACT

An imaging apparatus includes: an apparatus body having a substantially box-like shape and having an imaging lens provided on the front side; and a cover member including a sliding portion slidably supported on the front surface of the apparatus body, a pivotal portion pivotally supported at a side portion of the apparatus body and including a standing piece that faces the front surface of the apparatus body, and a connecting portion that connects the standing piece to the sliding portion, wherein causing the standing piece to face the front surface of the apparatus body produces a lens blocking state in which the imaging lens is blocked, whereas causing the standing piece to stand on the front surface of the apparatus body not only forms a grip formed of the pivotal portion and the connecting portion but also produces a lens unblocking state in which the imaging lens is unblocked.

10 Claims, 11 Drawing Sheets

IMAGING APPARATUS

CROSS-REFERENCE TO RELATED APPLICATION

The present application claims priority from Japanese Patent Application No. JP 2008-209282 filed in the Japanese Patent Office on Aug. 15, 2008, the entire content of which is incorporated herein by reference.

BACKGROUND OF THE INVENTION

1. Field of the Invention

The present invention relates to an imaging apparatus including a cover member that can slide relative to an apparatus body to form a grip.

2. Description of the Related Art

Imaging apparatus, such as digital still cameras, have been reduced in size and thickness. Such an imaging apparatus includes an apparatus body having a flat, substantially box-like shape, an imaging lens provided on the front side of the apparatus body, and a display unit, such as a liquid crystal monitor, provided on the rear side of the apparatus body.

An imaging apparatus reduced in size and thickness is often gripped only by the tips of user's fingers at the time of capturing an image. In this case, the user has a poor gripping sensation. When the user presses an imaging button without an adequate gripping sensation, a captured image is likely blurred or what is called a hand-shake likely occurs.

Further, when the display unit provided on the rear side of the apparatus body is large, the palm and the tips of fingers disadvantageously hide the display unit when the user grips the apparatus body. When the user grips the apparatus body in such a way that the palm and the tips of fingers do not hide the display unit, the apparatus body is not stably gripped. On the other hand, when the apparatus body is provided with a grip that can be gripped by a hand, the grip protrudes from the apparatus body and degrades the portability of the apparatus.

To address the above problem, an imaging apparatus that has been proposed includes a cover member that can slide relative to an apparatus body to form a grip.

JP-A-2007-163589, for example, describes an existing imaging apparatus of this type. JP-A-2007-163589 describes a technology of a portable digital camera with a display unit. The digital camera described in JP-A-2007-163589 includes an apparatus body with a display unit and a flexible cover slidable relative to the apparatus body. The cover, which has a first form in which the display unit of the apparatus body is covered, is deformed into a second form in which the display unit is uncovered and the deformed cover forms a cylindrical grip at a side of the apparatus body.

JP-A-9-244135, for example, describes another imaging apparatus of the type described above. JP-A-9-244135 describes a technology of a camera with a lens cover that also serves as a grip. The camera described in JP-A-9-244135 includes a camera body with an imaging lens provided therein, a sliding member that can cover or uncover the imaging lens, and a flexible strip provided between the sliding member and a front side portion of the camera body. When the user slides the sliding member toward the side portion of the camera body, part of the strip protrudes forward from the camera body to form a grip used when the user captures an image.

SUMMARY OF THE INVENTION

In the digital camera described in JP-A-2007-163589, however, the user needs to catch a flat portion of the cover with a finger to slide the cover, and the catching action disadvantageously produces frictional resistance between the cover and the display unit. Accordingly, the user may not be able to slide the cover smoothly. Further, when the user slides the cover by catching an end of the cover with a finger, the finger may touch the display unit and disadvantageously soil or scratch the display unit.

On the other hand, when using the camera described in JP-A-9-244135 as well, the user needs to catch a flat portion of the sliding member with a finger to slide the sliding member, and the catching action disadvantageously produces frictional resistance between the sliding member and a lens barrel. Accordingly, the user may not be able to slide the sliding member smoothly. Further, when the user slides the sliding member by catching an end of the sliding member with a finger, the finger may touch an imaging lens and disadvantageously soil or scratch the imaging lens.

Thus, it is desirable that, with an imaging apparatus including a sliding portion that a user slides to not only cover or uncover an imaging lens but also form a grip, the user can smoothly slide the sliding portion. When the user slides the sliding portion, it is also desirable not to allow a finger or a hand to touch an imaging lens when it is not covered with a cover member of the sliding portion.

An imaging apparatus according to an embodiment of the invention includes an apparatus body and a cover member. The apparatus body has a substantially box-like shape and has an imaging lens provided on the front side. The cover member includes a sliding portion slidably supported on the front surface of the apparatus body, a pivotal portion pivotally supported at a side portion of the apparatus body and including a standing piece that faces the front surface of the apparatus body, and a connecting portion that connects the standing piece to the sliding portion. The cover member is configured in such a way that causing the standing piece to face the front surface of the apparatus body produces a lens blocking state in which the imaging lens is blocked, whereas causing the standing piece to stand on the front surface of the apparatus body not only forms a grip formed of the pivotal portion and the connecting portion but also produces a lens unblocking state in which the imaging lens in unblocked.

In the imaging apparatus according to the embodiment of the invention, to change the state of the cover member from the lens blocking state to the lens unblocking state, the pivotal portion is pivoted so that the standing piece stands on the front surface of the apparatus body. In this process, the standing piece and the connecting portion protrude forward from the apparatus body, and the pivotal portion and the connecting portion form a grip of the imaging apparatus. Further, the motion of the connecting portion causes the sliding portion to slide, whereby the imaging lens is unblocked.

According to the imaging apparatus of the embodiment of the invention, the sliding operation of the sliding portion can be carried out smoothly. In this operation, the user's finger or hand will not touch the imaging lens when it is not covered with the sliding portion.

DESCRIPTION OF THE PREFERRED EMBODIMENTS

The best mode for achieving imaging apparatus according to embodiments of the invention will be described below with reference to the drawings. The invention, however, is not limited to the following forms.

1. First Embodiment

[Exemplary Exterior Configuration of Imaging Apparatus]

An exterior configuration of an imaging apparatus according to a first embodiment of the invention will first be described with reference to FIGS. 1 to 3.

It is assumed in the following description that the front/rear direction, the up/down direction, and the right/left direction are defined with respect to the user's (photographing user's) viewpoint. It is also assumed that a subject is on the front side and the photographing user is on the rear side.

Figure 1:
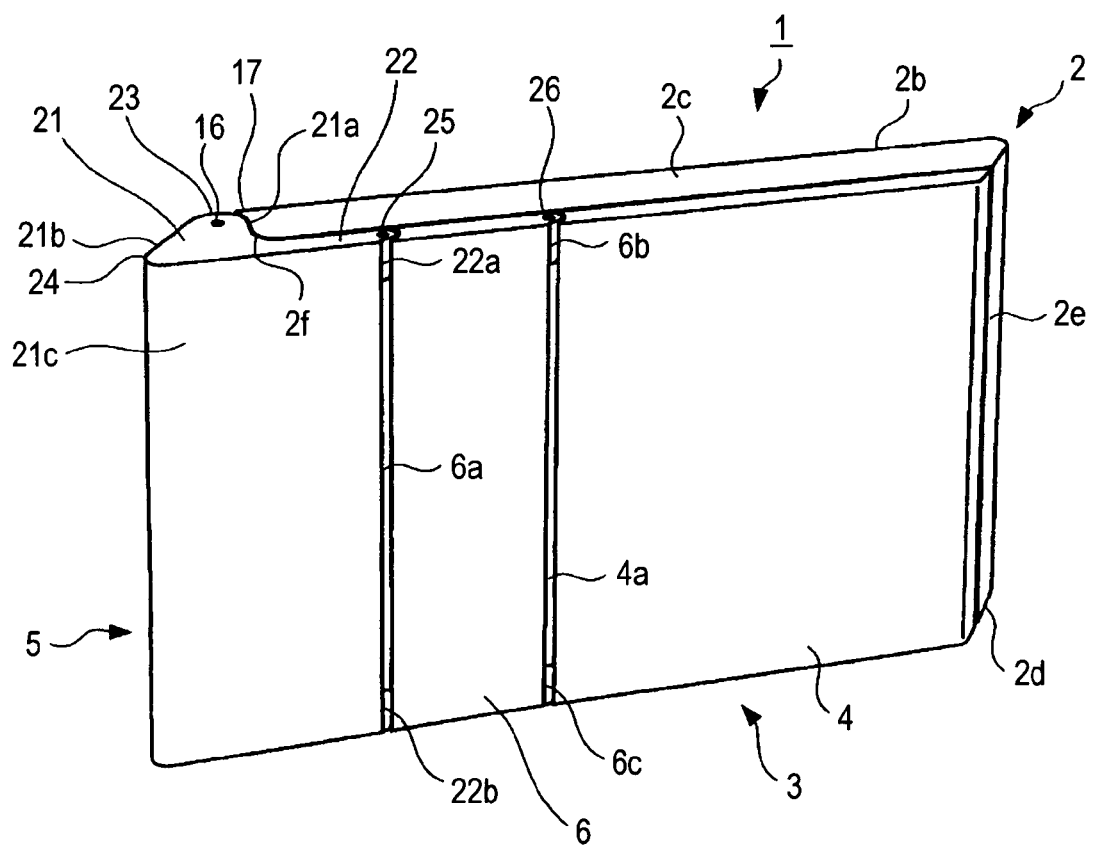
FIG. 1 is a front exterior perspective view showing an imaging apparatus according to a first embodiment of the invention with an imaging lens blocked.

FIG. 1 is a front exterior perspective view of the imaging apparatus according to the first embodiment of the invention with an imaging lens blocked. FIG. 2 is a front exterior perspective view of the imaging apparatus with the imaging lens unblocked. FIG. 3 is a rear perspective view of the imaging apparatus according to the first embodiment of the invention with the imaging apparatus gripped.

The imaging apparatus 1 is what is called a digital still camera and can convert an optical image of a subject into an electric signal, record it on an information recording medium, and display an image based on the electric signal on a liquid crystal display, an organic EL display, or any other suitable display unit.

The imaging apparatus 1 includes an apparatus body 2 having a flat, horizontally long, substantially box-like shape and a cover member 3 slidably provided on the front surface of the apparatus body 2. The cover member 3 includes a sliding portion 4 slidably supported on the front surface of the apparatus body 2, a pivotal portion 5 pivotally supported at a side portion of the apparatus body 2, and a connecting portion 6 that connects the sliding portion 4 to the pivotal portion 5.

The apparatus body 2 has a front surface 2a facing the front (see FIG. 2), a rear surface 2b facing the rear (see FIG. 3), a top surface 2c, a bottom surface 2d, a left side surface 2e, and a right side surface 2f. An imaging lens 11 on which light from a subject is incident is disposed on the left side of the front surface 2a of the apparatus body 2 and exposed to the outside (see FIG. 2). The imaging lens 11 is covered with the sliding portion 4, whereas exposed when the sliding portion 4 is caused to slide. A shutter button (not shown) to be pressed at the time of imaging, a power button (not shown) to be pressed to turn on and off a power source, and other components are provided on the top surface 2c of the apparatus body.

A display unit 12 is disposed on the rear surface 2b (see FIG. 3) of the apparatus body 2. The display unit 12 is formed of a flat panel, such as a liquid crystal display. The display unit 12 has a horizontally long, rectangular shape and is sized to occupy nearly all the rear surface 2b. A variety of operation buttons, such as a playback button (not shown) to be pressed to display a captured image on the display unit 12, are also provided on the rear surface 2b of the apparatus body 2.

The sliding portion 4 of the cover member 3 is formed of a rectangular plate that covers substantially one-half the front surface 2a of the apparatus body 2, and has right and left side portions extending in the up/down direction and substantially as long as the apparatus body 2 in the up/down direction. The sliding portion 4 slides in the right/left direction of the apparatus body 2 to cover or uncover the imaging lens 11.

Figure 2:
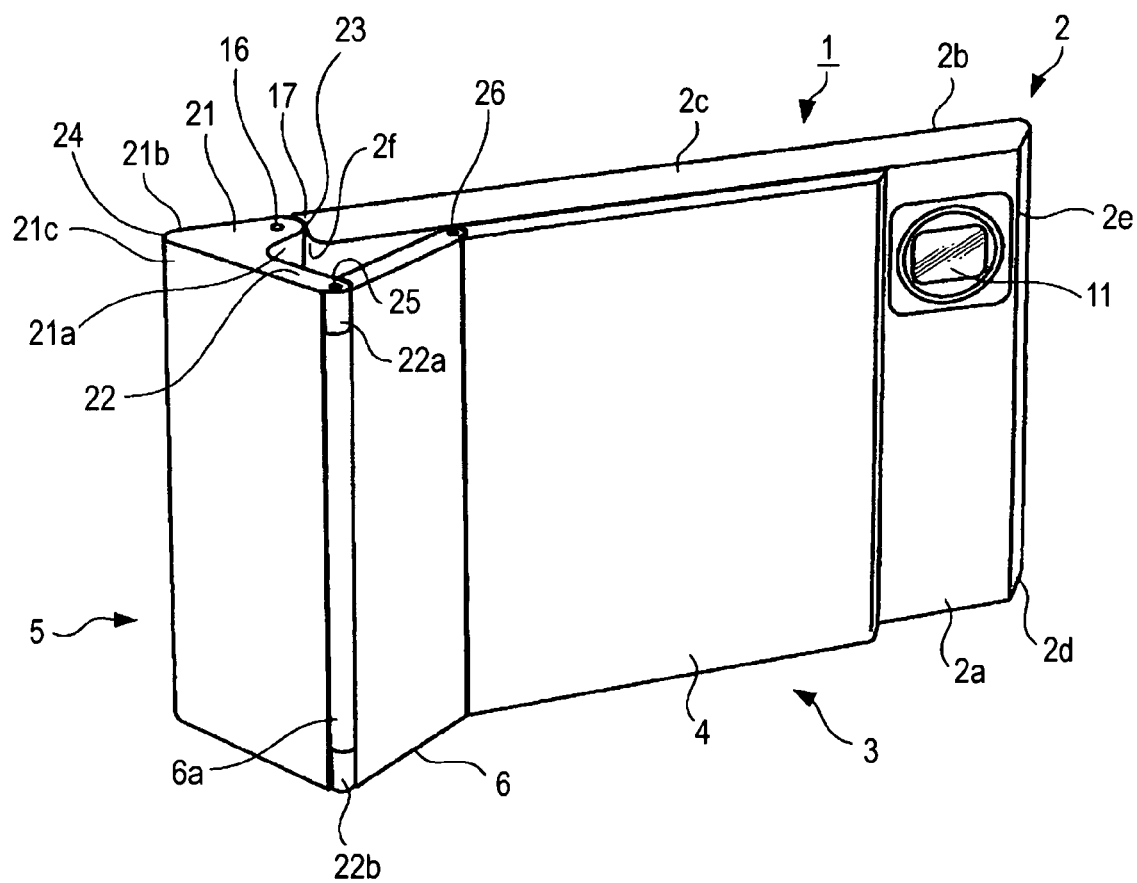
FIG. 2 is a front exterior perspective view showing the imaging apparatus according to the first embodiment of the invention with the imaging lens unblocked.
Figure 3:
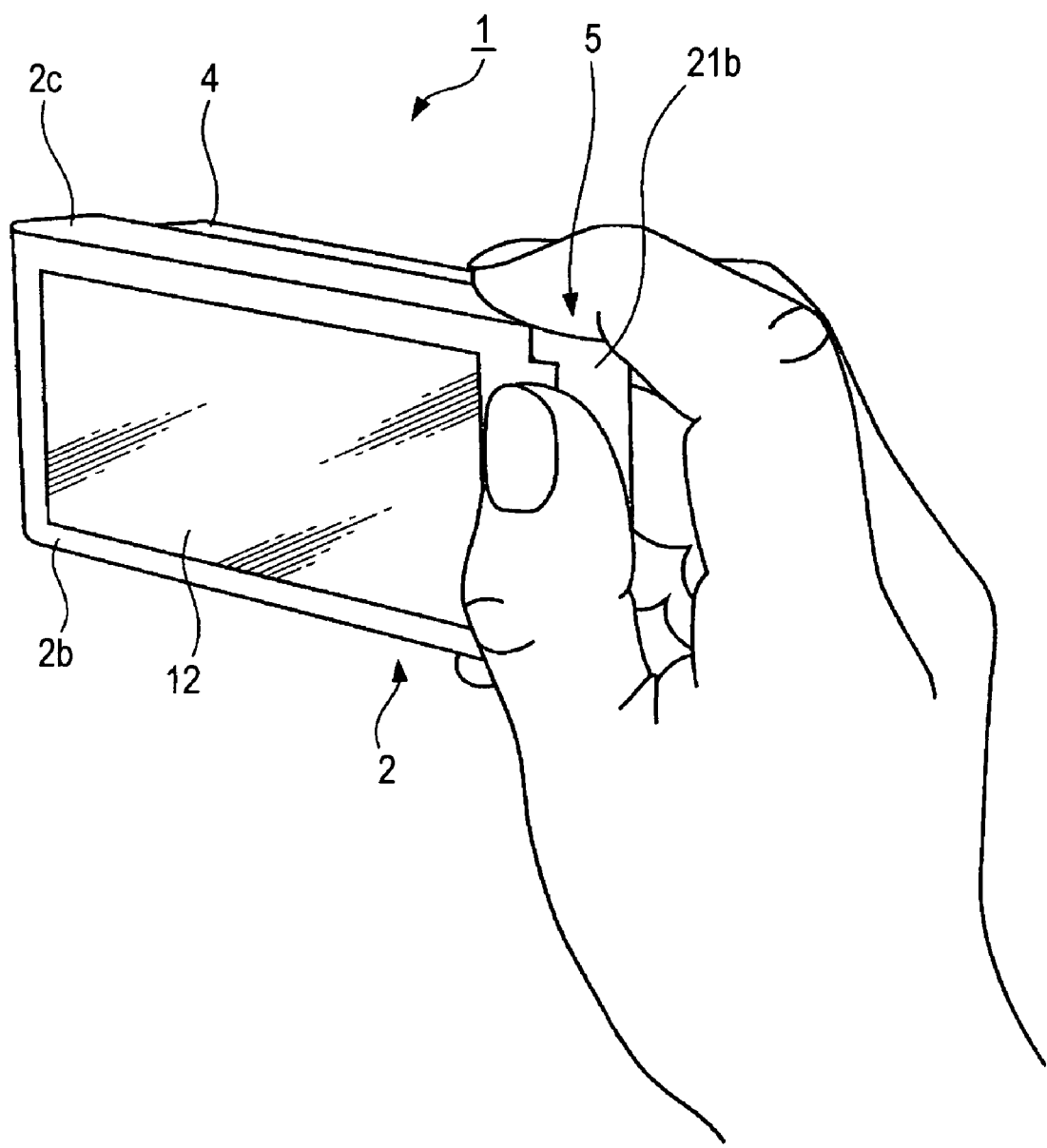
FIG. 3 is a rear perspective view of the imaging apparatus according to the first embodiment of the invention with the imaging apparatus gripped.

When the sliding portion 4 blocks the imaging lens 11, the cover member 3 is in a lens blocking state (see FIG. 1), whereas when the sliding portion 4 is caused to slide so that the imaging lens 11 is unblocked, the cover member 3 is in a lens unblocking state (see FIG. 2). That is, when the sliding portion 4 in the lens blocking state slides rightward, the imaging lens 11 is unblocked. In the present embodiment, when the cover member 3 transits from the lens blocking state to the lens unblocking state, the imaging apparatus 1 is configured to be turned on.

In the lens blocking state, the left side portion of the sliding portion 4 forms a flat surface that is flush with the left side surface 2e of the apparatus body 2. A shaft receiving piece 4a is provided in the right side portion, which faces the connecting portion 6, of the sliding portion 4. The shaft receiving piece 4a has a shaft receiving hole (not shown) extending therethrough in the up/down direction, and a second connection shaft 26, which will be described later, is pressed into the shaft receiving hole and fixed there.

The pivotal portion 5 has a substantially L shape when viewed from the above, and the length of the pivotal portion 5 in the up/down direction is substantially the same as the length of the apparatus body 2 in the up/down direction. The pivotal portion 5 includes a base piece 21 pivotally supported at a right side portion of the apparatus body 2 and a standing piece 22 contiguous to the base piece 21.

The base piece 21 is shaped into a substantially triangular column and includes a first side surface 21a, a second side surface 21b, and a third side surface 21c, which are perpendicular to the horizontal direction. The first side surface 21a faces a right side surface 2f of the imaging apparatus 2 in the lens blocking state. The second side surface 21b forms the right side surface of the imaging apparatus 1 in the lens blocking state, whereas being flush with the rear surface 2b of the apparatus body 2 in the lens unblocking state. The third side surface 21c is contiguous to the standing piece 22.

A corner 23 formed by the first side surface 21a and the second side surface 21b of the base piece 21 forms a shaft receiving portion through which a pivotal shaft 16 extending in the up/down direction passes. That is, the base piece 21 is pivotally supported by the pivotal shaft 16 at the right side portion of the apparatus body 2. The outer surface of the corner 23 has an arcuate shape and slides along the right side surface 2f of the apparatus body 2 when the pivotal portion 5 is pivoted.

A corner 24 formed by the second side surface 21b and the third side surface 21c of the base piece 21 forms an action portion used when the pivotal portion 5 is pivoted. That is, the user catches the corner 24 with a finger and applies a force to the corner 24 to pivot the pivotal portion 5.

A stopper 17 that stops the pivotal motion of the pivotal portion 5 in the lens unblocking state is provided along the right side surface 2f of the apparatus body 2. The stopper 17 is formed of a protrusion having an arcuate concave surface that mates with the corner 23 of the base piece 21. The arcuate corner 23 of the base piece 21 can slide along the arcuate concave surface of the stopper 17, but the second side surface 21b contiguous to the corner 23 cannot slide along the arcuate concave surface of the stopper 17. As a result, the pivotal motion of the pivotal portion 5 is stopped when the second side surface 21b of the base piece 21 becomes flush with the rear surface 2b of the apparatus body 2.

As described above, the base piece 21 is shaped into a substantially triangular column, and the second side surface 21b forms the right side surface of the imaging apparatus 1 in the lens blocking state whereas being flush with the rear surface 2b of the apparatus body 2 in the lens unblocking state. The angle over which the pivotal portion 5 pivots is therefore smaller than 90 degrees (approximately 45 degrees in the present example).

The standing piece 22 is shaped into a flat plate protruding from the first side surface 21a of the base piece 21 in a direction substantially perpendicular to the first side surface 21a. The standing piece 22 faces the front surface 2a of the apparatus body 2 in the lens blocking state, whereas the standing piece 22 stands and is inclined to the front surface 2a of the apparatus body 2 in the lens unblocking state. A pair of shaft receiving portions 22a and 22b is provided in a front end portion of the standing piece 22 and spaced apart from each other by a predetermined distance in the up/down direction. Each of the shaft receiving portions 22a and 22b has a shaft receiving hole (not shown) extending in the up/down direction. Both ends of a first connecting shaft 25 are inserted into the shaft receiving holes.

The connecting portion 6 is shaped into a vertically long, flat plate extending in the up/down direction, and right and left side portions that form the longer sides of the connecting portion 6 are substantially as long as the apparatus body 2 in the up/down direction. A first shaft receiving piece 6a is provided in the right side portion of the connecting portion 6 between the pair of shaft receiving portions 22a and 22b of the standing piece 22. The first shaft receiving piece 6a has a shaft receiving hole (not shown) extending therethrough in the up/down direction, and a middle portion of the first connecting shaft 25 is pressed into the shaft receiving hole and fixed there. The first connecting shaft 25 pivotally connects the standing piece 22 of the pivotal portion 5 to the connecting portion 6.

On the other hand, a left side portion of the connecting portion 6 faces the sliding portion 4. Second shaft receiving pieces 6b and 6c are provided in the left side portion of the connecting portion 6. The second shaft receiving pieces 6b and 6c are spaced apart from each other by a predetermined distance in the up/down direction, and each of the shaft receiving pieces 6b and 6c has a shaft receiving hole (not shown) extending in the up/down direction. Both ends of the second connecting shaft 26, which is pressed into the shaft receiving piece 4a of the sliding portion 4 and fixed there, are inserted into the shaft receiving holes. The second connecting shaft 26 pivotally connects the connecting portion 6 to the sliding portion 4.

The connecting portion 6 faces the front surface 2a of the apparatus body 2 in the lens blocking state. On the other hand, the standing motion of the standing piece 22 of the pivotal portion 5 causes the connecting portion 6 to protrude forward from the apparatus body 2 in the lens unblocking state. In this process, the standing piece 22 and the connecting portion 6 form a substantially triangular protrusion protruding forward from the imaging apparatus 1. The pivotal portion 5 and the connecting portion 6 thus form a grip of the imaging apparatus 1. The user grips the pivotal portion 5 and the connecting portion 6, which form the grip, to stably hold the imaging apparatus 1 during an imaging operation.

[Exemplary Configuration of Control Circuit in Imaging Apparatus]

A control circuit in the imaging apparatus 1 will next be described with reference to FIG. 4.

Figure 4:
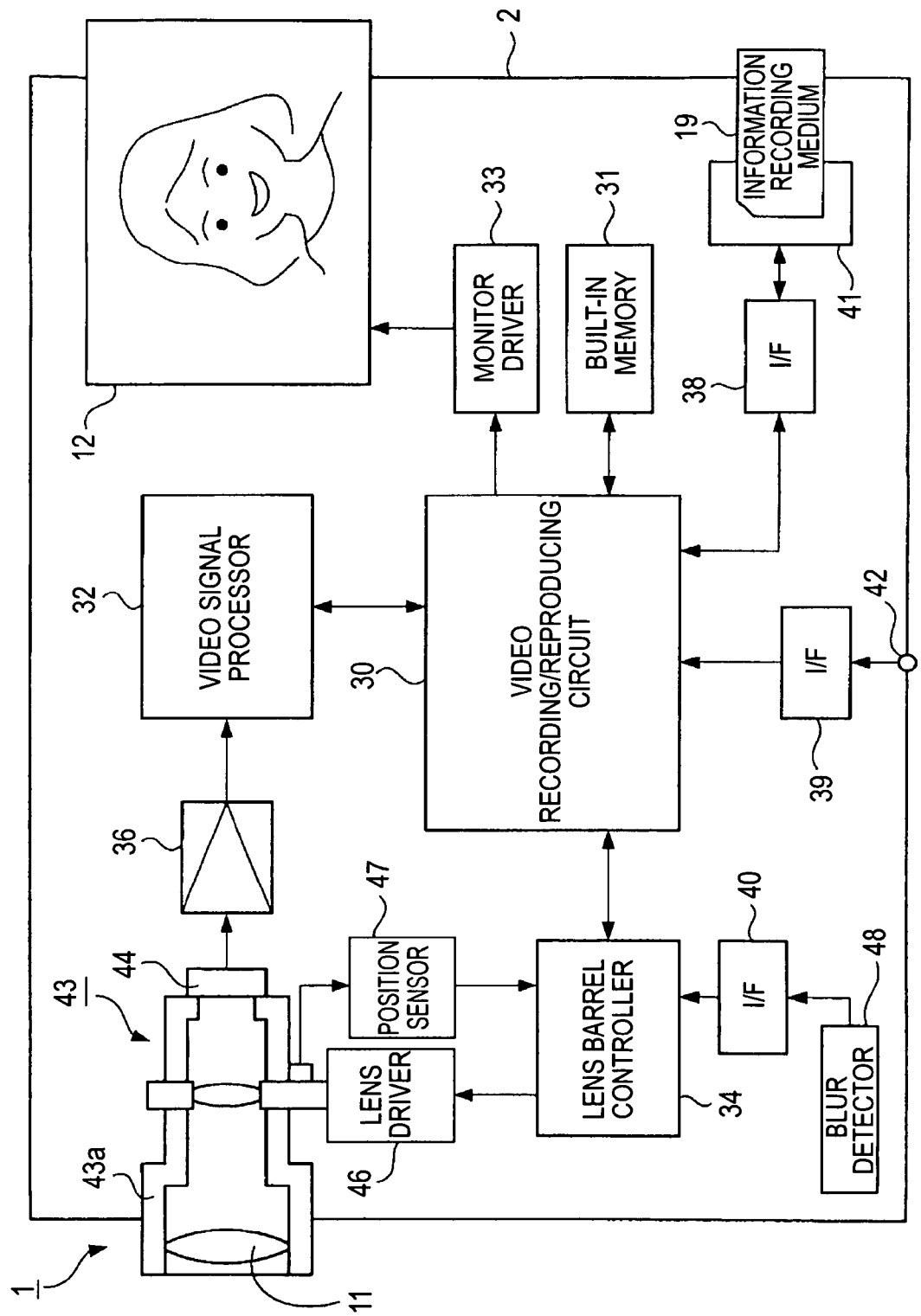
FIG. 4 is a block diagram showing an example of a control circuit in the imaging apparatus according to the first embodiment of the invention.

FIG. 4 is a block diagram showing an example of the control circuit in the imaging apparatus 1.

The imaging apparatus 1 includes a video recording/reproducing circuit 30 that plays a central role in the control circuit, a built-in memory 31, a video signal processor 32, a monitor driver 33, and a lens barrel controller 34.

The video recording/reproducing circuit 30 includes a computation circuit having, for example, a central processing unit (CPU). The video recording/reproducing circuit 30 is connected to the built-in memory 31, the video signal processor 32, the monitor driver 33, the lens barrel controller 34, an amplifier 36, a first interface (I/F) 38, and a second interface (I/F) 39.

The first interface (I/F) 38 is connected to a connector 41. An information recording medium 19 is detachably connected to the connector 41. The second interface (I/F) 39 is connected to a connection terminal 42 provided in the apparatus body 2.

The video recording/reproducing circuit 30 produces image data based on a video signal supplied from the video signal processor 32 and outputs the image data to the monitor driver 33. The video recording/reproducing circuit 30 further records the produced image data on the information recording medium 19 and reads the image data recorded on the information recording medium 19 via the first interface (I/F) 38.

The built-in memory 31 includes a ROM (Read Only Memory) and a RAM (Random Access Memory). The ROM stores, for example, programs executed in the video recording/reproducing circuit 30 and data necessary to carry out processes in the programs. The RAM is used to temporarily store data when the video recording/reproducing circuit 30 executes any of the programs.

The video signal processor 32 is connected via the amplifier 36 to an imaging device 44 attached to a lens barrel 43. The lens barrel 43 will be described below. The lens barrel 43 includes a plurality of lenses including the imaging lens 11 and a barrel housing 43a that secures or movably supports the plurality of lenses. The imaging device 44, which converts the light introduced through the plurality of lenses including the imaging lens 11 into an electric signal, is fixed to the barrel housing 43a. The imaging device 44 can be a CCD image sensor, a CMOS image sensor, or any other suitable image sensor.

The electric signal outputted from the imaging device 44 is amplified by the amplifier 36 and then inputted to the video signal processor 32. The video signal processor 32 processes the supplied electric signal to produce a video signal and outputs it to the video recording/reproducing circuit 30.

The monitor driver 33 produces an image display signal based on the image data supplied from the video recording/reproducing circuit 30 and outputs the image display signal to the display unit 12. The display unit 12 displays an image based on the supplied image display signal.

A lens driver 46 and a position sensor 47 are connected to the lens barrel controller 34. Examples of the lens driver 46 may include a zoom motor that moves a predetermined lens in the lens barrel 43 in the optical axis direction and a correction lens actuator that moves an image blur correction lens in the direction perpendicular to the optical axis direction. The position sensor 47 detects the position of the image blur correction lens. For example, when the correction lens actuator is formed of a magnet and a coil, the position sensor 47 can be a Hall device that detects the magnetism of the magnet.

A blur detector 48 is connected to the lens barrel controller 34 via a third interface (I/F) 40. The blur detector 48 detects a shift due to shake, swing, and other motions of the apparatus body 2. The blur detector 48 can be an acceleration sensor or a gyroscopic sensor.

When the light from a subject enters the imaging lens 11, the light is guided through the lens system in the lens barrel 43 and focused on the image focusing surface of the imaging device 44. The imaging device 44 converts the light focused on the image focusing surface into an electric signal. The electric signal outputted from the imaging device 44 is inputted to the video signal processor 32 via the amplifier 36.

The video signal processor 32 processes the supplied electric signal to produce a video signal and outputs it to the video recording/reproducing circuit 30. The video recording/reproducing circuit 30 produces image data based on the video signal and outputs the image data to the monitor driver 33 and the information recording medium 19. As a result, the image corresponding to the light from the subject is displayed on the display unit 12 and recorded on the information recording medium 19.

[Sliding Operation of Sliding Portion]

The sliding operation of the sliding portion 4 will next be described with reference to FIGS. 1 to 3.

In the lens blocking state shown in FIG. 1, since the entire front surface 2a of the apparatus body 2 is covered with the sliding portion 4, the connecting portion 6, and the standing piece 22, the imaging apparatus 1 has a flat, horizontally long, substantially box-like shape. Therefore, the imaging apparatus 1 has a portable shape in the lens blocking state. It is noted that pressing the playback button in the lens blocking state allows the user to view captured images even when the imaging apparatus 1 is not ready to capture an image.

To allow the imaging apparatus 1 to capture an image, the state of the cover member 3 is changed from the lens blocking state to the lens unblocking state to expose the imaging lens 11. To change the state of the cover member 3 from the lens blocking state to the lens unblocking state, the pivotal portion 5 of the cover member 3 is pivoted so that the standing piece 22 stands on the front surface 2a of the apparatus body 2. The pivotal motion of the pivotal portion 5 is stopped by the stopper 17 of the apparatus body 2 when the second side surface 21b of the base piece 21 becomes flush with the rear surface 2b of the apparatus body 2.

When the standing piece 22 of the pivotal portion 5 shifts and stands on the front surface 2a of the apparatus body 2, the connecting portion 6 shifts rightward relative to the apparatus body 2 while pivoting relative to the standing piece 22 and the sliding portion 4. As a result, the sliding portion 4 pivotally connected to the connecting portion 6 slides rightward relative to the apparatus body 2, producing the lens unblocking state in which the imaging lens 11 is unblocked (see FIG. 2).

When the connecting portion 6 shifts rightward relative to the apparatus body 2 while pivoting relative to the standing piece 22, the standing piece 22 and the connecting portion 6 form a substantially triangular protrusion protruding forward from the apparatus body 2. As a result, the pivotal portion 5 and the connecting portion 6 form a grip of the imaging apparatus 1. Since the second side surface 21b of the base piece 21 is flush with the rear surface 2b of the apparatus body 2 when the grip is formed, the grip has a shape easily gripped by the user (see FIG. 3).

To change the state of the cover member 3 from the lens unblocking state shown in FIG. 2 to the lens blocking state shown in FIG. 1, the pivotal portion 5 is pivoted so that the standing piece 22 faces the front surface 2a of the apparatus body 2. When the standing piece 22 shifts and faces the front surface 2a of the apparatus body 2, the connecting portion 6 shifts leftward relative to the apparatus body 2 while pivoting relative to the standing piece 22. As a result, the sliding portion 4 pivotally connected to the connecting portion 6 slides leftward relative to the apparatus body 2, producing the lens blocking state in which the imaging lens 11 is blocked.

The amount of the sliding motion of the sliding portion 4 is determined by the following two factors: the height to which the standing piece 22 of the pivotal portion 5 stands from the front surface 2a of the apparatus body 2 and the length of the shorter side of the connecting portion 6. For example, when the length of the shorter side of the connecting portion 6 is substantially the same as the height to which the standing piece 22 stands from the front surface 2a of the apparatus body 2, the amount of shift over which the connecting portion 6 shifts rightward relative to the apparatus body 2 is maximized, and the amount of the sliding motion of the sliding portion 4 is also maximized. The height to which the standing piece 22 stands from the front surface 2a of the apparatus body 2 is determined by the following two factors: the angle over which the pivotal portion 5 pivots and the length from the first side surface 21a of the base piece 21 to the tip of the standing piece 22.

According to the imaging apparatus 1 of the present embodiment, the sliding operation of the sliding portion 4 can be carried out smoothly and the grip of the imaging apparatus 1 can be very easily formed only by pivoting the pivotal portion 5 of the cover member 3. Further, when the user slides the sliding portion 4, the user does not need to be concerned that the user's finger or hand touches the imaging lens 11 when it is not covered with the sliding portion 4.

The pivotal portion 5 and the connecting portion 6 of the imaging apparatus 1 are made of an engineering plastic or any other suitable synthetic resin or an aluminum alloy or any other suitable metal material so that the pivotal portion 5 and the connecting portion 6 are strong enough not to bend. Therefore, when the user grips the pivotal portion 5 and the connecting portion 6, which form the grip, the grip will not be bent or crushed by the force applied by the user but will be readily gripped.

Further, in the imaging apparatus 1, the base piece 21 of the pivotal portion 5 is shaped into a substantially triangular column. That is, the base piece 21 has the first side surface 21a, which faces the right side surface 2f of the apparatus body 2 in the lens blocking state, the second side surface 21b, which has a flat surface flush with the rear surface 2b of the apparatus body 2 in the lens unblocking state, and the third side surface 21c, which is contiguous to the standing piece 22. In this configuration, the range over which the pivotal portion 5 pivots is smaller than 90 degrees (approximately 45 degrees in the present example), whereby the pivotal portion 5 can be readily pivoted to easily cover or uncover the imaging lens 11.

2. Second Embodiment

[Exemplary Exterior Configuration of Imaging Apparatus]

An exterior configuration of an imaging apparatus according to a second embodiment of the invention will next be described with reference to FIGS. 5 and 6.

Figure 5:
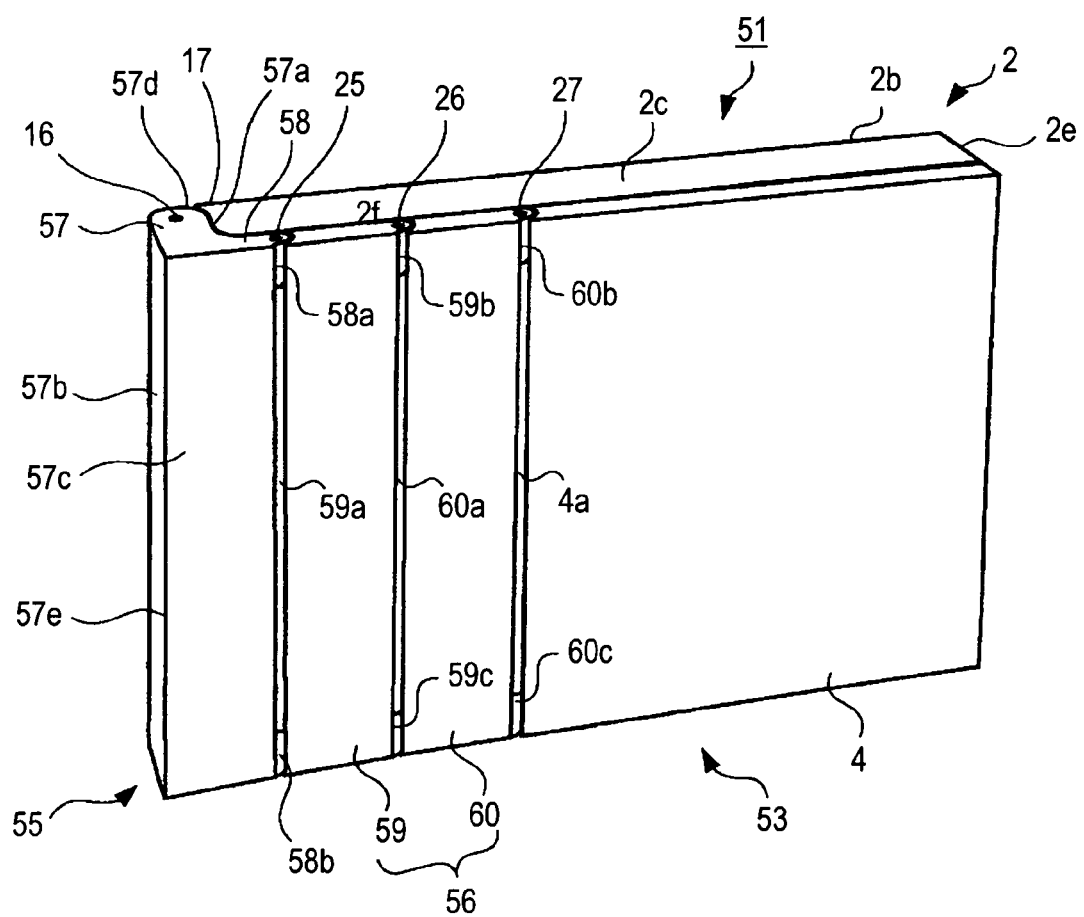
FIG. 5 is a front exterior perspective view showing an imaging apparatus according to a second embodiment of the invention with an imaging lens blocked.
Figure 6:
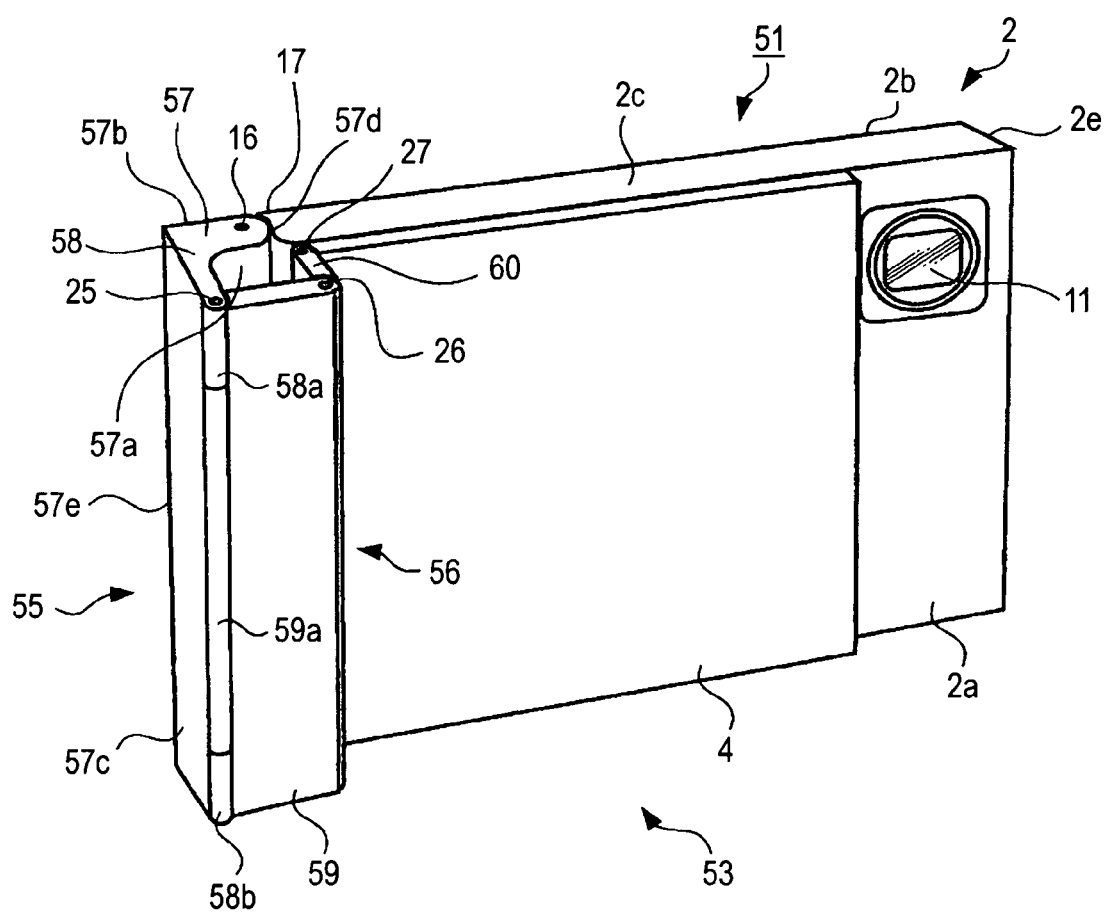
FIG. 6 is a front exterior perspective view showing the imaging apparatus according to the second embodiment of the invention with the imaging lens unblocked.

FIG. 5 is a front exterior perspective view of the imaging apparatus according to the second embodiment of the invention with an imaging lens blocked. FIG. 6 is a front exterior perspective view of the imaging apparatus with the imaging lens unblocked.

The imaging apparatus 51, which is the second embodiment of the invention, has a configuration similar to that of the imaging apparatus 1 of the first embodiment but differs therefrom in terms of a pivotal portion 55 and a connecting portion 56 of a cover member 53. The pivotal portion 55 and the connecting portion 56 will therefore be described below. The portions common to those of the imaging apparatus 1 have the same reference characters, and no redundant description of the common portions will be made.

The cover member 53 of the imaging apparatus 51 includes the sliding portion 4, the pivotal portion 55 pivotally supported at a side portion of the apparatus body 2, and the connecting portion 56 that connects the sliding portion 4 to the pivotal portion 55.

The pivotal portion 55 has a substantially L shape when viewed from the above and includes a base piece 57 pivotally supported at a right side portion of the apparatus body and a standing piece 58 contiguous to the base piece 57. The base piece 57 is pivotally supported at the right side portion of the apparatus body by the pivotal shaft 16 extending in the up/down direction of the apparatus body 2. That is, the pivotal shaft 16 passes in the up/down direction through a shaft receiving portion (not shown) provided in the base piece 57 and a shaft receiving piece (not shown) provided in the right side portion of the apparatus body.

The base piece 57 is shaped into a substantially rectangular column and has a height that is substantially the same as the length of the apparatus body 2 in the up/down direction. The base piece 57 has a first side surface 57a, a second side surface 57b that is opposite the first side surface 57a, a third side surface 57c, and an arcuate surface 57d that is opposite the third side surface 57c. The first side surface 57a faces the right side surface 2f of the apparatus body 2 in the lens blocking state.

The second side surface 57b forms the right side surface of the imaging apparatus 51 in the lens blocking state, whereas being flush with the rear surface 2b of the apparatus body 2 in the lens unblocking state. The third side surface 57c is contiguous to the standing piece 58. A corner 57e formed by the second side surface 57b and the third side surface 57c of the base piece 57 is an action portion that the user catches with a finger when the user pivots the pivotal portion 55.

The arcuate surface 57d of the base piece 57 slides along the right side surface 2f of the apparatus body 2 when the pivotal portion 55 is pivoted. The pivotal motion of the pivotal portion 55 is stopped by the stopper 17 provided in the apparatus body 2 in the lens unblocking state in which the second side surface 21b of the base piece 21 is flush with the rear surface 2b of the apparatus body 2. The range over which the pivotal portion 55 pivots is approximately 90 degrees.

The standing piece 58 is shaped into a flat plate protruding from the first side surface 57a of the base piece 57 in a direction substantially perpendicular to the first side surface 57a. The standing piece 58 faces the front surface 2a of the apparatus body 2 in the lens blocking state, whereas the standing piece 58 stands in the direction perpendicular to the front surface 2a of the apparatus body 2 in the lens unblocking state. A pair of shaft receiving portions 58a and 58b is provided in a front end portion of the standing piece 58 and spaced apart from each other by a predetermined distance in the up/down direction. Each of the shaft receiving portions 58a and 58b has a shaft receiving hole (not shown) extending in the up/down direction. Both ends of the first connection shaft 25 are inserted into the shaft receiving holes.

The connecting portion 56 includes a first connecting piece 59 pivotally connected to the standing piece 58 and a second connecting piece 60 pivotally connected to the first connecting piece 59 and the sliding portion 4. Each of the first connecting piece 59 and the second connecting piece 60 is shaped into a vertically long, flat plate extending in the up/down direction and has longer sides substantially as long as the apparatus body 2 in the up/down direction.

A right side portion of the first connecting piece 59 faces the standing piece 58. A first shaft receiving portion 59a is provided in the right side portion of the first connecting piece 57 between the pair of shaft receiving portions 58a and 58b of the standing piece 58. The first shaft receiving portion 59a has a shaft receiving hole (not shown) extending therethrough in the up/down direction, and a middle portion of the first connecting shaft 25 is pressed into the shaft receiving hole and fixed there. The first connecting shaft 25 pivotally connects the standing piece 58 of the pivotal portion 55 to the first connecting piece 59.

Second shaft receiving portions 59b and 59c are provided in a left side portion of the first connecting piece 59. The second shaft receiving portions 59b and 59c are spaced apart from each other by a predetermined distance in the up/down direction, and each of the shaft receiving portions 59b and 59c has a shaft receiving hole (not shown) extending in the up/down direction. Both ends of the second connecting shaft 26 are inserted into the shaft receiving holes.

A right side portion of the second connecting piece 60 faces the left side portion of the first connecting piece 59. A third shaft receiving portion 60a is provided in the right side portion of the second connecting piece 60 between the second shaft receiving portions 59b and 59c of the first connecting piece 59. The third shaft receiving portion 60a has a shaft receiving hole (not shown) extending therethrough in the up/down direction, and a middle portion of the second connecting shaft 26 is pressed into the shaft receiving hole and fixed there. The second connecting shaft 26 pivotally connects the first connecting piece 59 to the second connecting piece 60.

A left side portion of the second connecting piece 60 faces the sliding portion 4. Fourth shaft receiving portions 60b and 60c are provided in the left side portion of the second connecting piece 60. The fourth shaft receiving portions 60b and 60c are spaced apart from each other by a predetermined distance in the up/down direction, and each of the shaft receiving portions 60b and 60c has a shaft receiving hole (not shown) extending in the up/down direction. Both ends of a third connecting shaft 27 pressed into the shaft receiving piece 4a of the sliding portion 4 and fixed there are inserted into the shaft receiving holes. The third connecting shaft 27 pivotally connects the second connecting piece 60 to the sliding portion 4.

The two connecting pieces 59 and 60 of the connecting portion 56 face the front surface 2a of the apparatus body 2 in the lens blocking state. On the other hand, the standing motion of the standing piece 58 of the pivotal portion 55 causes the two connecting pieces 59 and 60 to protrude forward from the apparatus body 2 in the lens unblocking state. In this process, the standing piece 58 and the two connecting pieces 59 and 60 form a substantially rectangular protrusion protruding forward from the imaging apparatus 51. The pivotal portion 55 and the connecting portion 56 thus form a grip of the imaging apparatus 51. The user grips the pivotal portion 55 and the connecting portion 56, which form the grip, to stably hold the imaging apparatus 51 during an imaging operation.

[Sliding Operation of Sliding Portion]

The sliding operation of the sliding portion 4 in the second embodiment will next be described.

In the lens blocking state shown in FIG. 5, since the entire front surface 2a of the apparatus body 2 is covered with the sliding portion 4, the connecting portion 56, and the standing piece 58, the imaging apparatus 51 has a flat, horizontally long, substantially box-like shape. Therefore, the imaging apparatus 51 has a portable shape in the lens blocking state.

To change the state of the cover member 53 from the lens blocking state to the lens unblocking state, the pivotal portion 55 of the cover member 53 is pivoted so that the standing piece 58 stands on the front surface 2a of the apparatus body 2. The pivotal motion of the pivotal portion 55 is stopped by the stopper 17 of the apparatus body 2 when the second side surface 57b of the base piece 57 becomes flush with the rear surface 2b of the apparatus body 2.

When the standing piece 58 of the pivotal portion 55 stands on the front surface 2a of the apparatus body 2, the two connecting pieces 59 and 60 of the connecting portion 56 shift rightward relative to the apparatus body 2 while pivoting at the same time, and pull the sliding portion 4. As a result, the sliding portion 4 slides rightward relative to the apparatus body 2, and the state of the cover member 53 changes to the lens unblocking state in which the imaging lens 11 is unblocked (see FIG. 6).

In the lens unblocking state, the standing piece 58 and the two connecting pieces 59 and 60 protrude forward and form a substantially rectangular protrusion. As a result, the pivotal portion 55 and the connecting portion 56 form a grip of the imaging apparatus 51. Since the second side surface 57b of the base piece 57 is flush with the rear surface 2b of the apparatus body 2 when the grip is formed, the grip has a shape easily gripped by the user.

To change the state of the cover member 53 from the lens unblocking state to the lens blocking state, the pivotal portion 55 is pivoted so that the standing piece 58 faces the front surface 2a of the apparatus body 2. The two connecting pieces 59 and 60 thus shift leftward relative to the apparatus body 2 while pivoting at the same time, and push the sliding portion 4. As a result, the sliding portion 4 slides leftward relative to the apparatus body 2, and the state of the cover member 53 changes to the lens blocking state in which the imaging lens 11 is blocked.

While the two connecting pieces 59 and 60 pivotally connected to each other form the connecting portion 56 in the present embodiment, the connecting portion according to the present embodiment of the invention may be formed of three or more connecting pieces pivotally connected to each other. In this case, the standing piece 58 and the three or more connecting pieces form a polygonal protrusion protruding forward from the apparatus body 2 in the lens unblocking state.

In the imaging apparatus 51 of the present embodiment as well, the sliding operation of the sliding portion 4 can be carried out smoothly and the grip of the imaging apparatus 51 can be very easily formed only by pivoting the pivotal portion 55 of the cover member 53, as in the case of the imaging apparatus 1 of the first embodiment. Further, when the user slides the sliding portion 4, the user does not need to be concerned that the user's finger or hand touches the imaging lens 11 when it is not covered with the sliding portion 4.

3. Third Embodiment

[Exemplary Exterior Configuration of Imaging Apparatus]

An exterior configuration of an imaging apparatus according to a third embodiment of the invention will next be described with reference to FIGS. 7 and 8.

Figure 7:
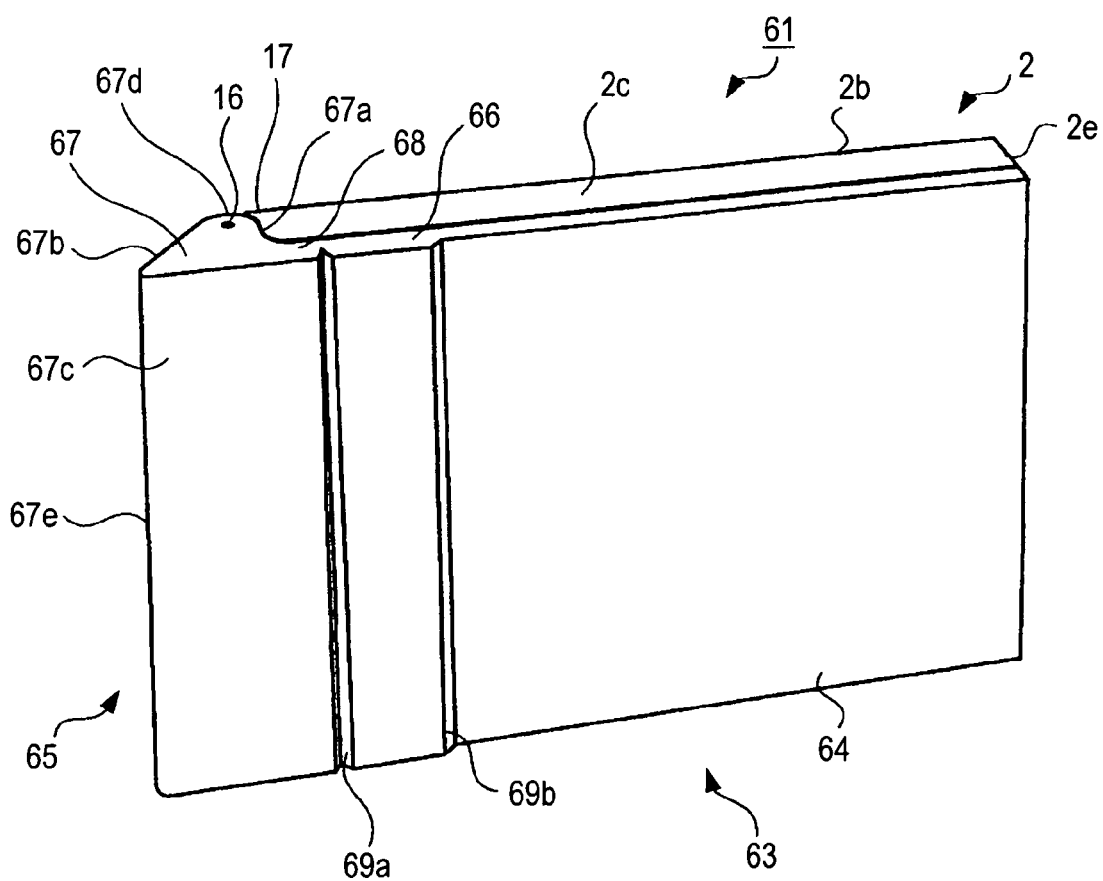
FIG. 7 is a front exterior perspective view showing an imaging apparatus according to a third embodiment of the invention with an imaging lens blocked.
Figure 8:
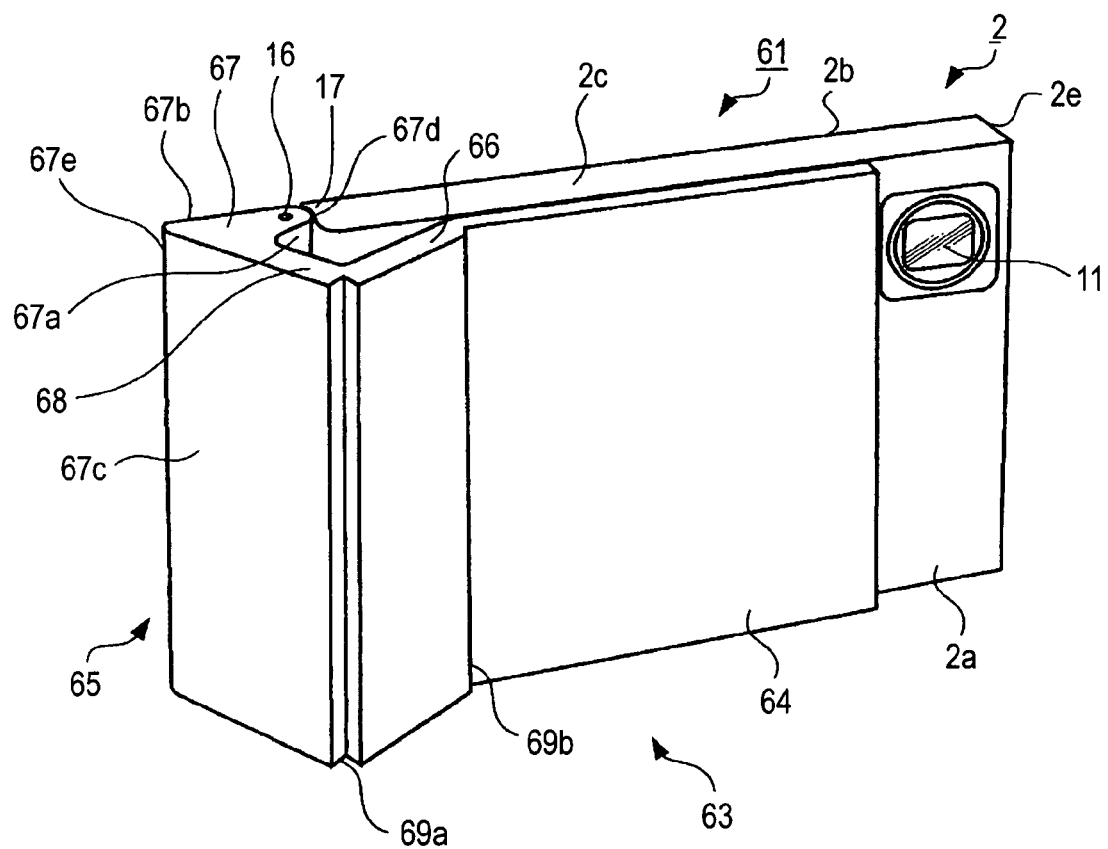
FIG. 8 is a front exterior perspective view showing the imaging apparatus according to the third embodiment of the invention with the imaging lens unblocked.

FIG. 7 is a front exterior perspective view of the imaging apparatus according to the third embodiment of the invention with an imaging lens blocked. FIG. 8 is a front exterior perspective view of the imaging apparatus with the imaging lens unblocked.

The imaging apparatus 61, which is the third embodiment of the invention, has a configuration similar to that of the imaging apparatus 1 of the first embodiment but differs therefrom in terms of a cover member 63. The cover member 63 will therefore be described below. The portions common to those of the imaging apparatus 1 have the same reference characters, and no redundant description of the common portions will be made.

The cover member 63 is integrally formed of a bendable member made of a rubber material, a resin material, or any other suitable material. The cover member 63 includes a sliding portion 64 slidably supported on the front surface of the apparatus body 2, a pivotal portion 65 pivotally supported at a side portion of the apparatus body 2, and a connecting portion 66 that connects the sliding portion 64 to the pivotal portion 65.

The sliding portion 64 is formed of a rectangular plate that covers substantially one-half the front surface 2a of the apparatus body 2. The sliding portion 64 slides in the right/left direction of the apparatus body 2 to cover or uncover the imaging lens 11. When the sliding portion 64 blocks the imaging lens 11, the cover member 63 is in the lens blocking state (see FIG. 7), whereas when the sliding portion 64 is caused to slide so that the imaging lens 11 is unblocked, the cover member 63 is in the lens unblocking state (see FIG. 8).

The pivotal portion 65 has the same shape as that of the pivotal portion 5 in the first embodiment, and includes a base piece 67 pivotally supported by the pivotal shaft 16 at a right side portion of the apparatus body 2 and a standing piece 68 contiguous to the base piece 67.

The base piece 67 is shaped into a substantially triangular column and has a height that is substantially the same as the length of the apparatus body 2 in the up/down direction. The base piece 67 has a first side surface 67a, a second side surface 67b, and a third side surface 67c, which are perpendicular to the horizontal direction. A corner 67d formed by the first side surface 67a and the second side surface 67b of the base piece 67 has an arcuate shape. A corner 67e formed by the second side surface 67b and the third side surface 67c of the base piece 67 is an action portion that the user catches with a finger when the user pivots the pivotal portion 65.

The standing piece 68 is shaped into a flat plate protruding from the first side surface 67a of the base piece 67 in a direction substantially perpendicular to the first side surface 67a. The standing piece 68 faces the front surface 2a of the apparatus body 2 in the lens blocking state, whereas the standing piece 68 stands and is inclined to the front surface 2a of the apparatus body 2 in the lens unblocking state. The connecting portion 66 is shaped into a vertically long, flat plate extending in the up/down direction.

The standing piece 68 and the connecting portion 66 are contiguous to each other but bendable at a groove 69a provided along the boundary therebetween and extending in the up/down direction. Similarly, the connecting portion 66 and the sliding portion 64 are contiguous to each other but bendable at a groove 69b provided along the boundary therebetween and extending in the up/down direction.

The connecting portion 66 faces the front surface 2a of the apparatus body 2 in the lens blocking state. On the other hand, the standing motion of the standing piece 68 of the pivotal portion 65 causes the connecting portion 66 to protrude forward from the apparatus body 2 in the lens unblocking state. In this process, the standing piece 68 and the connecting portion 66 form a substantially triangular protrusion protruding forward from the imaging apparatus 61. The pivotal portion 65 and the connecting portion 66 thus form a grip of the imaging apparatus 61. The user grips the pivotal portion 65 and the connecting portion 66, which form the grip, to stably hold the imaging apparatus 61 during an imaging operation.

[Sliding Operation of Sliding Portion]

The sliding operation of the sliding portion 64 will next be described.

In the lens blocking state shown in FIG. 7, since the entire front surface 2a of the apparatus body 2 is covered with the sliding portion 64, the connecting portion 66, and the standing piece 68, the imaging apparatus 61 has a flat, horizontally long, substantially box-like shape. Therefore, the imaging apparatus 61 has a portable shape in the lens blocking state.

To change the state of the cover member 63 from the lens blocking state to the lens unblocking state, the pivotal portion 65 of the cover member 63 is pivoted so that the standing piece 68 stands on the front surface 2a of the apparatus body 2. The pivotal motion of the pivotal portion 65 is stopped by the stopper 17 of the apparatus body 2 when the second side surface 67b of the base piece 67 becomes flush with the rear surface 2b of the apparatus body 2.

When the standing piece 68 of the pivotal portion 65 stands on the front surface 2a of the apparatus body 2, the connecting portion 66 shifts rightward relative to the apparatus body 2 while inclined to the standing piece 68 and the sliding portion 64, and pulls the sliding portion 64. As a result, the sliding portion 64 slides rightward relative to the apparatus body 2, and the state of the cover member 63 changes to the lens unblocking state in which the imaging lens 11 is unblocked (see FIG. 8).

In the lens unblocking state, the standing piece 68 and the connecting portion 66 protrude forward and form a substantially triangular protrusion. As a result, the pivotal portion 65 and the connecting portion 66 form a grip of the imaging apparatus 61. Since the second side surface 67b of the base piece 67 is flush with the rear surface 2b of the apparatus body 2 when the grip is formed, the grip has a shape easily gripped by the user.

To change the state of the cover member 63 from the lens unblocking state to the lens blocking state, the pivotal portion 65 is pivoted so that the standing piece 68 faces the front surface 2a of the apparatus body 2. The connecting portion 66 thus shifts leftward relative to the apparatus body 2 while returning to the state in which the connecting portion 66 is parallel to the sliding portion 64, and pushes the sliding portion 64. As a result, the sliding portion 64 slides leftward relative to the apparatus body 2, and the state of the cover member 63 changes to the lens blocking state in which the imaging lens 11 is blocked.

In the imaging apparatus 61 of the present embodiment as well, the sliding operation of the sliding portion 64 can be carried out smoothly and the grip of the imaging apparatus 61 can be very easily formed, as in the case of the imaging apparatus 1 of the first embodiment. Further, when the user slides the sliding portion 64, the user does not need to be concerned that the user's finger or hand touches the imaging lens 11 when it is not covered with the sliding portion 64.

While the connecting portion 66 is formed as a single plate in the present embodiment, the connecting portion according to the present embodiment of the invention may be formed of two or more connecting pieces bendably connected to each other. In this case, the standing portion 68 and the two or more connecting pieces form a rectangular or polygonal protrusion protruding forward from the apparatus body 2 in the lens unblocking state.

4. Fourth Embodiment

[Exemplary Exterior Configuration of Imaging Apparatus]

An exterior configuration of an imaging apparatus according to a fourth embodiment of the invention will next be described with reference to FIGS. 9 and 10.

Figure 9:
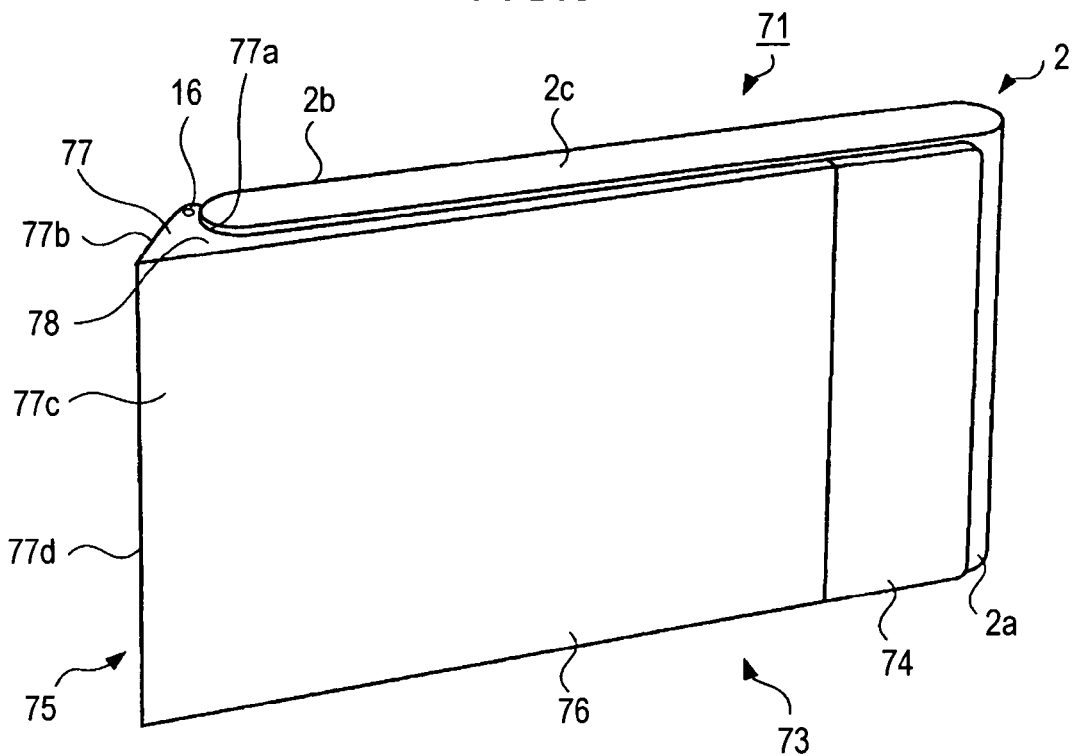
FIG. 9 is a front exterior perspective view showing an imaging apparatus according to a fourth embodiment of the invention with an imaging lens blocked.
Figure 10:
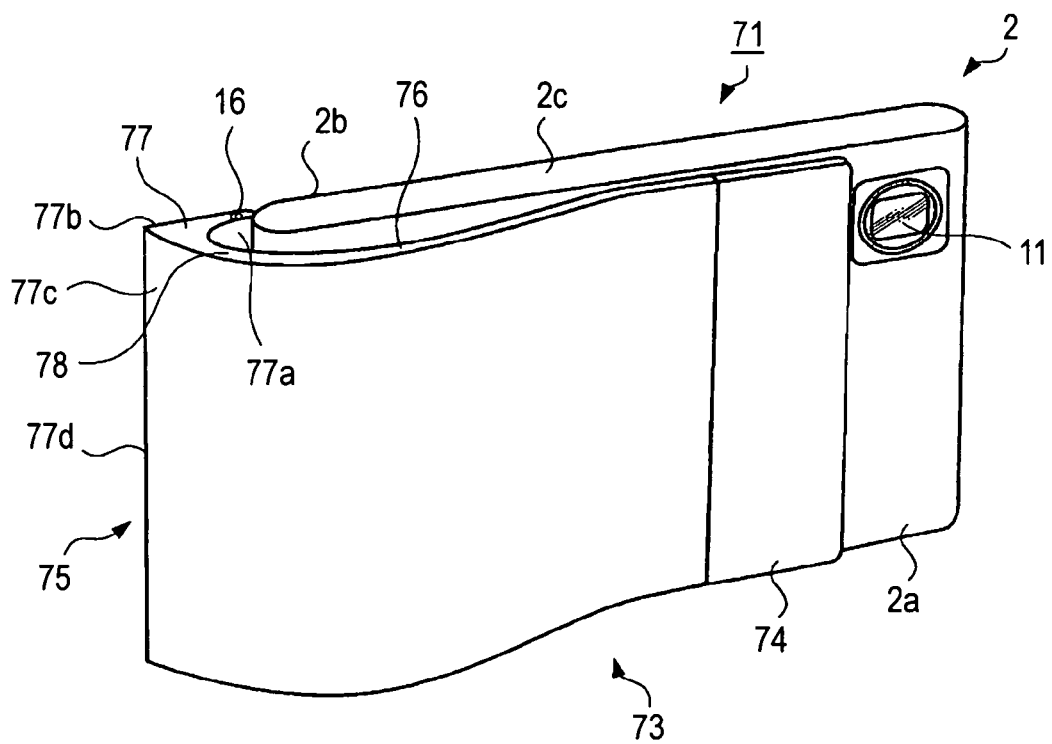
FIG. 10 is a front exterior perspective view showing the imaging apparatus according to the fourth embodiment of the invention with the imaging lens unblocked.

FIG. 9 is a front exterior perspective view of the imaging apparatus according to the fourth embodiment of the invention with an imaging lens blocked. FIG. 10 is a front exterior perspective view of the imaging apparatus with the imaging lens unblocked.

The imaging apparatus 71, which is the fourth embodiment of the invention, has a configuration similar to that of the imaging apparatus 1 of the first embodiment but differs therefrom in terms of a cover member 73. The cover member 73 will therefore be described below. The portions common to those of the imaging apparatus 1 have the same reference characters and, no redundant description of the common portions will be made.

The cover member 73 includes a sliding portion 74 slidably supported on the front surface of the apparatus body 2, a pivotal portion 75 pivotally supported at a side portion of the apparatus body 2, and a connecting portion 76 that connects the sliding portion 74 to the pivotal portion 75.

The sliding portion 74 is formed of a vertically long, rectangular plate that covers the left side of the front surface 2a of the apparatus body 2. The sliding portion 74 slides in the right/left direction of the apparatus body 2 to cover or uncover the imaging lens 11. When the sliding portion 74 blocks the imaging lens 11, the cover member 73 is in the lens blocking state (see FIG. 9), whereas when the sliding portion 74 is caused to slide so that the imaging lens 11 is unblocked, the cover member 73 is in the lens unblocking state (see FIG. 10).

The pivotal portion 75 and the connecting portion 76 are integrally formed of a bendable member made of a rubber material or any other suitable material. The pivotal portion 75 has a substantially L shape when viewed from the above, and includes a base piece 77 pivotally supported at a right side portion of the apparatus body 2 and a standing piece 78 contiguous to the base piece 77. The base piece 77 is pivotally supported at the right side portion of the apparatus body 2 by the pivotal shaft 16 extending in the up/down direction of the apparatus body 2.

The base piece 77 is shaped into a substantially triangular column and has a height that is substantially the same as the length of the apparatus body 2 in the up/down direction. The base piece 77 has an arcuate concave surface 77a, a first side surface 77b, and a second side surface 77c. The arcuate concave surface 77a faces the right side surface 2f of the apparatus body 2 in the lens blocking state. The arcuate concave surface 77a therefore has a size corresponding to that of the right side surface 2f of the apparatus body 2.

The first side surface 77b forms the right side surface of the imaging apparatus 71 in the lens blocking state, whereas being flush with the rear surface 2b of the apparatus body 2 in the lens unblocking state. The second side surface 77c is contiguous to the standing piece 78. A corner 77d formed by the first side surface 77b and the second side surface 77c of the base piece 77 is an action portion that the user catches with a finger when the user pivots the pivotal portion 75.

The standing piece 78 has a strip shape protruding from the arcuate concave surface 77a of the base piece 77 in a direction substantially perpendicular to the arcuate concave surface 77a. The standing piece 78 faces the front surface 2a of the apparatus body 2 in the lens blocking state, whereas the standing piece 78 stands and is inclined to the front surface 2a of the apparatus body 2 in the lens unblocking state. The thus configured pivotal portion 75, when pivoted until the lens unblocking state is achieved, is locked by a stopper (not shown) provided in the right side portion of the apparatus body 2.

The connecting portion 76 is shaped into a horizontally long, strip contiguous to the standing piece 78 of the pivotal portion 75. A front end portion of the connecting portion 76 is fixed to a right side portion of the sliding portion 74. The connecting portion 76 is configured to be thin enough to show flexibility. On the other hand, the pivotal portion 75 formed of the base piece 77 and the standing piece 78 is thicker than the connecting portion 76 so that the pivotal portion 75 has a shape that is not bendable or is hardly bendable.

The connecting portion 76 faces the front surface 2a of the apparatus body 2 in the lens blocking state. On the other hand, the standing motion of the standing piece 78 of the pivotal portion 75 causes the connecting portion 76 to bend and protrude forward from the apparatus body 2 in the lens unblocking state. The pivotal portion 75 and the connecting portion 76 thus form a grip of the imaging apparatus 71. The user grips the pivotal portion 75 and the connecting portion 76, which form the grip, to stably hold the imaging apparatus 71 during an imaging operation.

[Sliding Operation of Sliding Portion]

The sliding operation of the sliding portion 74 will next be described.

In the lens blocking state shown in FIG. 9, since the entire front surface 2a of the apparatus body 2 is covered with the sliding portion 74, the connecting portion 76, and the standing piece 78, the imaging apparatus 71 has a flat, horizontally long, substantially box-like shape. Therefore, the imaging apparatus 71 has a portable shape in the lens blocking state.

To change the state of the cover member 73 from the lens blocking state to the lens unblocking state, the pivotal portion 75 of the cover member 73 is pivoted so that the standing piece 78 stands on the front surface 2a of the apparatus body 2. The pivotal motion of the pivotal portion 75 is stopped by the stopper of the apparatus body 2 when the first side surface 77b of the base piece 77 becomes flush with the rear surface 2b of the apparatus body 2.

When the standing piece 78 of the pivotal portion 75 stands on the front surface 2a of the apparatus body 2, the connecting portion 76 shifts rightward relative to the apparatus body 2 while bending at the same time, and pulls the sliding portion 74. As a result, the sliding portion 74 slides rightward relative to the apparatus body 2, and the state of the cover member 73 changes to the lens unblocking state in which the imaging lens 11 is unblocked (see FIG. 10).

In the lens unblocking state, the standing piece 78 and the connecting portion 76 protrude forward and form a substantially arcuate (or parabolic) protrusion showing a slow curve. As a result, the pivotal portion 75 and the connecting portion 76 form a grip of the imaging apparatus 71. Since the first side surface 77b of the base piece 77 is flush with the rear surface 2b of the apparatus body 2 when the grip is formed, the grip has a shape easily gripped by the user.

To change the state of the cover member 73 from the lens unblocking state to the lens blocking state, the pivotal portion 75 is pivoted so that the standing piece 78 faces the front surface 2a of the apparatus body 2. The connecting portion 76 thus shifts leftward relative to the apparatus body 2 while returning to the state in which the connecting portion 76 is parallel to the sliding portion 74, and pushes the sliding portion 74. As a result, the sliding portion 74 slides leftward relative to the apparatus body 2, and the state of the cover member 73 changes to the lens blocking state in which the imaging lens 11 is blocked.

In the imaging apparatus 71 of the present embodiment as well, the sliding operation of the sliding portion 74 can be carried out smoothly and the grip of the imaging apparatus 71 can be very easily formed, as in the case of the imaging apparatus 1 of the first embodiment. Further, when the user slides the sliding portion 74, the user does not need to be concerned that the user's finger or hand touches the imaging lens 11 when it is not covered with the sliding portion 74.

5. Fifth Embodiment

[Exemplary Exterior Configuration of Imaging Apparatus]

An exterior configuration of an imaging apparatus according to a fifth embodiment of the invention will next be described with reference to FIG. 11.

Figure 11:
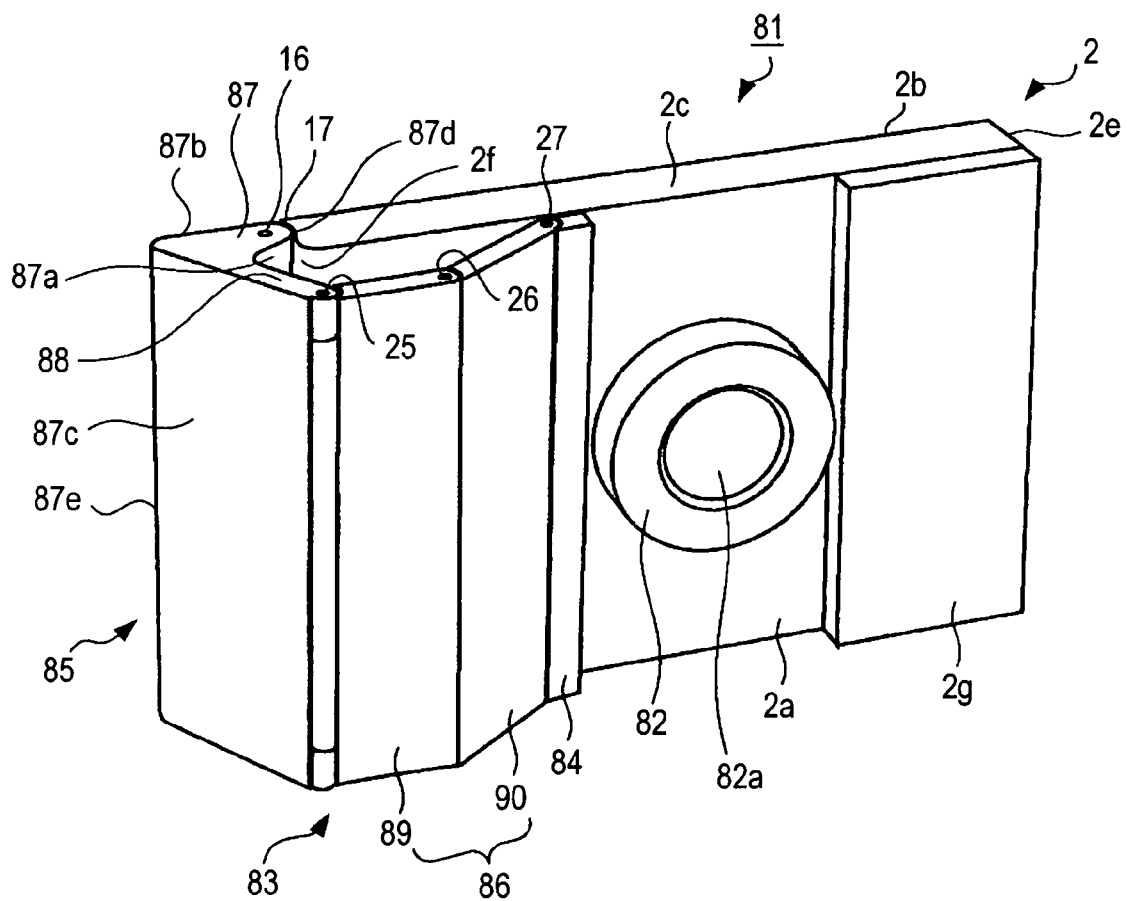
FIG. 11 is a front exterior perspective view showing an imaging apparatus according to a fifth embodiment of the invention with an imaging lens unblocked.

FIG. 11 is a front exterior perspective view of the imaging apparatus according to the fifth embodiment of the invention with an imaging lens unblocked.

The imaging apparatus 81, which is the fifth embodiment of the invention, has a configuration similar to that of the imaging apparatus 1 of the first embodiment but differs therefrom in terms of a lens barrel 82 provided in the apparatus body and a cover member 83. The lens barrel 82 and the cover member 83 will therefore be described below. The portions common to those of the imaging apparatus 1 have the same reference characters, and no redundant description of the common portions will be made.

The lens barrel 82, which is what is called a collapsible lens barrel, is retractably provided in a substantially central portion of the front surface 2a of the apparatus body 2. The lens barrel 82 includes a plurality of lenses including an imaging lens 82a and rings and frames that secure or movably support the plurality of lenses. The lens barrel 82 is brought forward out of the apparatus body 2 (see FIG. 11) when the imaging apparatus 81 is turned on, whereas collapsed into the apparatus body 2 (not shown) when the imaging apparatus 81 is turned off.

A step 2g that forms a flat surface flush with the cover member 83 is provided to the left of the lens barrel 82 on the front surface 2a of the apparatus body 2. The step 2g abuts a sliding portion 84, which will be described later, of the cover member 83 in the lens blocking state.

The cover member 83 includes the sliding portion 84 slidably supported on the front surface of the apparatus body 2, a pivotal portion 85 pivotally supported at a side portion of the apparatus body 2, and a connecting portion 86 that connects the sliding portion 84 to the pivotal portion 85.

The sliding portion 84 is formed of a rectangular plate that covers part of the front surface 2a of the apparatus body 2. The sliding portion 84 slides in the right/left direction of the apparatus body 2 to, along with the connecting portion 86, cover or uncover the lens barrel 82 (imaging lens 82a). When the sliding portion 84 and the connecting portion 86 block the lens barrel 82, the cover member 83 is in the lens blocking state, whereas when the sliding portion 84 is caused to slide so that the lens barrel 82 is unblocked, the cover member 83 is in the lens unblocking state (see FIG. 11).

In the present embodiment, when the state of the cover member 83 transits from the lens blocking state to the lens unblocking state, the imaging apparatus 81 is turned on and the lens barrel 82 is brought forward out of the apparatus body 2.

The pivotal portion 85 has the same shape as that of the pivotal portion 5 in the first embodiment, and includes a base piece 87 pivotally supported by the pivotal shaft 16 at a right side portion of the apparatus body 2 and a standing piece 88 contiguous to the base piece 87.

The base piece 87 is shaped into a substantially triangular column and has a height that is substantially the same as the length of the apparatus body 2 in the up/down direction. The base piece 87 has a first side surface 87a, a second side surface 87b, and a third side surface 87c. The outer surface of a corner 87d formed by the first side surface 87a and the second side surface 87b of the base piece 87 has an arcuate shape. A corner 87e formed by the second side surface 87b and the third side surface 87c is an action portion that the user catches with a finger when the user pivots the pivotal portion 85.

The standing piece 88 is shaped into a flat plate protruding from the first side surface 87a of the base piece 87 in a direction substantially perpendicular to the first side surface 87a. The standing piece 88 faces the front surface 2a of the apparatus body 2 in the lens blocking state, whereas the standing piece 88 stands and is inclined to the front surface 2a of the apparatus body 2 in the lens unblocking state.

The connecting portion 86 has the same configuration as that of the connecting portion 56 according to the second embodiment (see FIGS. 5 and 6), and includes a first connecting piece 89 and a second connecting piece 90. Each of the first connecting piece 89 and the second connecting piece 90 is shaped into a vertically long, flat plate extending in the up/down direction and has longer sides substantially as long as the apparatus body 2 in the up/down direction. The first connecting piece 89 is pivotally connected to the standing piece 88 by the first connecting shaft 25. The second connecting piece 90 is pivotally connected to the first connecting piece 89 by the second connecting shaft 26 and pivotally connected to the sliding portion 84 by the third connecting shaft 27.

The two connecting pieces 89 and 90 of the connecting portion 86 face the front surface 2a of the apparatus body 2 in the lens blocking state. On the other hand, the standing motion of the standing piece 88 causes the two connecting pieces 89 and 90 to protrude forward from the apparatus body 2 in the lens unblocking state. In this process, the standing piece 88 and the two connecting pieces 89 and 90 form a substantially trapezoidal protrusion, and the pivotal portion 85 and the connecting portion 86 form a grip of the imaging apparatus 81. The user grips the pivotal portion 85 and the connecting portion 86, which form the grip, to stably hold the imaging apparatus 81 during an imaging operation.

In the lens blocking state, since the sliding portion 84, the connecting portion 86, and the standing piece 88 are flush with the step 2g of the apparatus body 2, the imaging apparatus 81 has a flat, horizontally long, substantially box-like shape. Therefore, the imaging apparatus 81 has a portable shape in the lens blocking state.

A description of the sliding operation of the sliding portion 84 will be omitted because it is the same as the description of the sliding operation of the sliding portion 4 according to the second embodiment. In the imaging apparatus 81 of the present embodiment as well, the sliding operation of the sliding portion 84 can be carried out smoothly and the grip of the imaging apparatus 81 can be very easily formed, as in the case of the imaging apparatus 1 of the first embodiment. Further, when the user slides the sliding portion 84, the user does not need to be concerned that the user's finger or hand touches the lens barrel 82 (imaging lens 82a) when it is not covered with the sliding portion 84 and the connecting portion 86.

6. Sixth Embodiment

[Exemplary Exterior Configuration of Imaging Apparatus]

An exterior configuration of an imaging apparatus according to a sixth embodiment of the invention will next be described with reference to FIG. 12.

Figure 12:
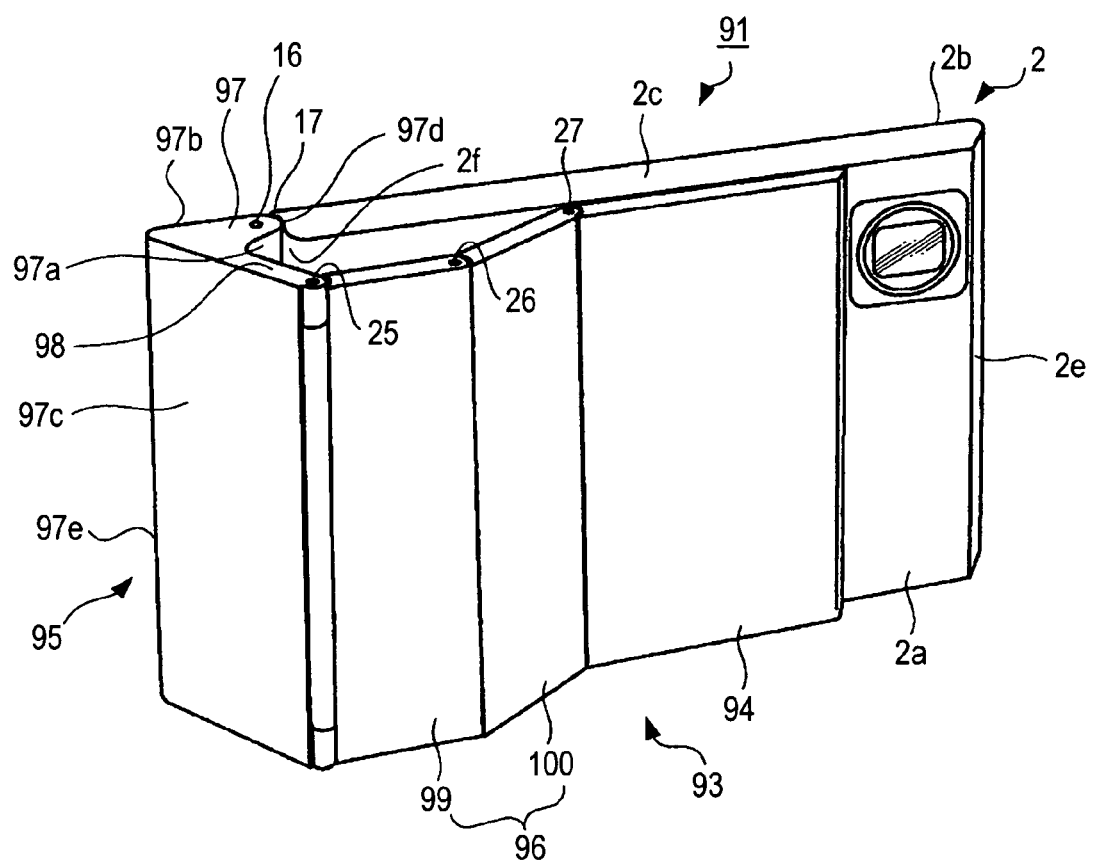
FIG. 12 is a front exterior perspective view showing an imaging apparatus according to a sixth embodiment of the invention with an imaging lens unblocked.

FIG. 12 is a front exterior perspective view of the imaging apparatus according to the sixth embodiment of the invention with an imaging lens unblocked.

The imaging apparatus 91, which is the sixth embodiment of the invention, has a configuration similar to that of the imaging apparatus 1 of the first embodiment but differs therefrom in terms of a cover member 93. The cover member 93 will therefore be described below. The portions common to those of the imaging apparatus 1 have the same reference characters, and no redundant description of the common portions will be made.

The cover member 93 includes a sliding portion 94 slidably supported on the front surface of the apparatus body 2, a pivotal portion 95 pivotally supported at a side portion of the apparatus body 2, and a connecting portion 96 that connects the sliding portion 94 to the pivotal portion 95.

The sliding portion 94 is formed of a rectangular plate that covers the left side of the front surface 2a of the apparatus body 2. The sliding portion 94 slides in the right/left direction of the apparatus body 2 to cover or uncover the imaging lens 11. When the sliding portion 94 blocks the imaging lens 11, the cover member 93 is in the lens blocking state, whereas the sliding portion 94 is caused to slide so that the imaging lens 11 is unblocked, the cover member 93 is in the lens unblocking state (see FIG. 12).

The pivotal portion 95 has the same configuration and shape as those of the pivotal portion 85 according to the fifth embodiment. That is, the pivotal portion 95 includes a base piece 97 pivotally supported at a right side portion of the apparatus body 2 and a standing piece 98 contiguous to the base piece 97. The base piece 97 is shaped into a substantially triangular column and has a first side surface 97a, a second side surface 97b, and a third side surface 97c.

The outer surface of a corner 97d formed by the first side surface 97a and the second side surface 97b of the base piece 97 has an arcuate shape. A corner 97e formed by the second side surface 97b and the third side surface 97c is an action portion that the user catches with a finger when the user pivots the pivotal portion 95. The standing piece 98 faces the front surface 2a of the apparatus body 2 in the lens blocking state, whereas the standing piece 98 stands and is inclined to the front surface 2a of the apparatus body 2 in the lens unblocking state.

The connecting portion 96 has the same configuration as that of the connecting portion 86 according to the fifth embodiment, and includes a first connecting piece 99 and a second connecting piece 100. Each of the first connecting piece 99 and the second connecting piece 100 is shaped into a vertically long, flat plate extending in the up/down direction and has longer sides substantially as long as the apparatus body 2 in the up/down direction. The first connecting piece 99 is pivotally connected to the standing piece 98 by the first connecting shaft 25. The second connecting piece 100 is pivotally connected to the first connecting piece 99 by the second connecting shaft 26 and pivotally connected to the sliding portion 94 by the third connecting shaft 27.

The two connecting pieces 99 and 100 of the connecting portion 96 face the front surface 2a of the apparatus body 2 in the lens blocking state. On the other hand, the standing motion of the standing piece 98 causes the two connecting pieces 99 and 100 to protrude forward from the apparatus body 2 in the lens unblocking state. In this process, the standing piece 98 and the two connecting pieces 99 and 100 form a substantially trapezoidal protrusion, and the pivotal portion 95 and the connecting portion 96 form a grip of the imaging apparatus 91. The user grips the pivotal portion 95 and the connecting portion 96, which form the grip, to stably hold the imaging apparatus 91 during an imaging operation.

In the lens blocking state, since the entire front surface 2a of the apparatus body 2 is covered with the sliding portion 94, the connecting portion 96, and the standing piece 98, the imaging apparatus 91 has a flat, horizontally long, substantially box-like shape. Therefore, the imaging apparatus 91 has a portable shape in the lens blocking state.

A description of the sliding operation of the sliding portion 94 will be omitted because it is the same as the description of the sliding operation of the sliding portion 4 according to the second embodiment. In the imaging apparatus 91 of the present embodiment as well, the sliding operation of the sliding portion 94 can be carried out smoothly and the grip of the imaging apparatus 91 can be very easily formed, as in the case of the imaging apparatus 1 of the first embodiment. Further, when the user slides the sliding portion 94, the user does not need to be concerned that the user's finger or hand touches the imaging lens 11 when it is not covered with the sliding portion 94.

The invention is not limited to the embodiments described above and illustrated in the drawings, but a variety of changes can be made to the extent that they do not depart from the spirit of the invention. For example, while the above embodiments have been described with reference to the case where a digital still camera is used as the imaging apparatus, the invention is also applicable to a still camera, a mobile phone terminal with a camera, and other imaging apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an apparatus body having a substantially box-like shape and having an imaging lens provided on the front side; and
    a cover member including a sliding portion slidably supported on the front surface of the apparatus body, a pivotal portion pivotally supported at a side portion of the apparatus body and including a standing piece that faces the front surface of the apparatus body, and a connecting portion that connects the standing piece to the sliding portion,
    wherein causing the standing piece to face the front surface of the apparatus body produces a lens blocking state in which the imaging lens is blocked, whereas causing the standing piece to stand on the front surface of the apparatus body not only forms a grip formed of the pivotal portion and the connecting portion but also produces a lens unblocking state in which the imaging lens is unblocked; and
    wherein the pivotal portion of the cover member has a flat surface to be flush with the rear surface of the apparatus body in the lens unblocking state.

2. The imaging apparatus according to claim 1, wherein the pivotal portion of the cover member further includes a base piece shaped into a substantially triangular column having a first side surface from which the standing piece protrudes, a second side surface having a flat surface to be flush with the rear surface of the apparatus body in the lens unblocking state, and a third side surface contiguous to the standing piece.

3. The imaging apparatus according to claim 1, wherein the apparatus body includes a stopper that stops the pivotal motion of the pivotal portion in the lens unblocking state.

4. The imaging apparatus according to claim 1, wherein the connecting portion of the cover member is pivotally connected to the standing piece and the sliding portion.

5. The imaging apparatus according to claim 1, wherein the connecting portion of the cover member is formed of two or more connecting pieces pivotally connected to each other.

6. The imaging apparatus according to claim 1, wherein the sliding portion and the pivotal portion of the cover member are integrally formed, and the connecting portion is bendably contiguous to the standing piece and the sliding portion.

7. The imaging apparatus according to claim 1, wherein the connecting portion of the cover member is formed of two or more connecting pieces bendably contiguous to each other.

8. The imaging apparatus according to claim 1, wherein the connecting portion is integrally formed with the pivotal portion and has flexibility.

9. The imaging apparatus according to claim 1, wherein the sliding portion of the cover member covers or uncovers the imaging lens.

10. The imaging apparatus according to claim 1, wherein the sliding portion and the connecting portion of the cover member cover or uncover the imaging lens.

* * * * *